United States Patent
Monica

[19]

[11] Patent Number: 6,060,408

[45] Date of Patent: May 9, 2000

[54] DOUBLE SIDED ADHESIVE USEFUL AS CLOTHING RETAINING MEANS

[75] Inventor: Mark D. Monica, Madison, N.J.

[73] Assignee: Creative Football Concepts, Inc., Madison, N.J.

[21] Appl. No.: 09/030,416

[22] Filed: Feb. 25, 1998

Related U.S. Application Data

[60] Provisional application No. 60/039,824, Feb. 27, 1997.

[51] Int. Cl.[7] .............................. B32B 7/12; A41D 13/00

[52] U.S. Cl. ........................... 442/65; 442/149; 428/343; 2/455

[58] Field of Search ................................ 428/343, 355 R; 442/89, 65, 149; 2/455

[56] References Cited

U.S. PATENT DOCUMENTS

| | | |
|---|---|---|
| 3,947,896 | 4/1976 | Taylor . |
| 4,522,870 | 6/1985 | Esmay . |
| 5,130,185 | 7/1992 | Ness . |
| 5,349,704 | 9/1994 | Masters . |
| 5,423,087 | 6/1995 | Kent et al. . |

*Primary Examiner*—Deborah Jones
*Assistant Examiner*—Jason Savage
*Attorney, Agent, or Firm*—Paul A. Schwarz; Buchanan Ingersoll, P.C.

[57] ABSTRACT

A double sided adhesive element, and methods for securing an article of clothing, having a flexible support member having a first side coated with an adhesive, and a second side coated with the adhesive. The adhesive element has a shape adapted to substantially conform to a portion of the wearer's protective pads.

12 Claims, 13 Drawing Sheets

DOUBLE SIDED ADHESIVE USEFUL AS CLOTHING RETAINING MEANS

CROSS REFERENCE TO RELATED APPLICATION

This application claims the benefit of U.S. Provisional Application No. 60/039,824 entitled "Jersey Retaining Means", filed by applicant on Feb. 27, 1997.

FIELD OF THE INVENTION

The present invention relates to double sided adhesive elements for securing an article of clothing, having a double sided flexible support member with an adhesive disposed on both sides. The adhesive element has a shape adapted to substantially conform to the shape of at least one portion of a protective pad.

BACKGROUND OF THE INVENTION

In high-contact sports, the players frequently wear protective pads. These pads are worn underneath a jersey or other article of clothing, protecting both the player and pads from the elements, as well as serving to identify the player's team. Such contact sports include for example, football, hockey, and lacrosse.

By way of example, the following discussion is directed toward certain problems associated with football, but these concerns are present with the other contact sports mentioned above. Thus, when reference is made to football pads, jerseys, or the like, this is meant to include any athletic pads or jerseys (or other articles of clothing) suitable for use with the present invention.

Each year, over one million people play organized football at the youth, high school, college, and professional levels in the United States. These players wear protective pads and jerseys. These jerseys may hang loose on the wearer, and thus can be grabbed by an opponent. The penalty for 'holding' is a common and costly penalty in football.

It is therefore desirable to limit an opponent's ability to grab hold of another player's jersey. In an effort to accomplish this task, linemen have their jerseys tailored to fit as tightly as possible. This method, however, has not proven successful. In the past, equipment managers also sprayed silicone on the jersey to prevent holding and cause the player to slip off that jersey. This has been detected and banned from use during games.

In an attempt to minimize movement of the jersey, some equipment managers place rectangular strips of double-sided vinyl tape on the player's shoulder pads before each game. This method is extremely time-consuming, and also has proven ineffective.

Accordingly, there is a need for a cost-effective means for securing a jersey which is not time-consuming and which is simple to use.

SUMMARY OF THE INVENTION

The present invention overcomes these problems by addressing the needs discussed above.

One aspect of the invention relates to a double sided adhesive element for securing an article of clothing comprising a flexible support member. The flexible support member has a first side coated with an adhesive, and a second side coated with the adhesive. The adhesive element has a shape adapted to substantially conform to the shape of at least one portion of a protective pad.

The invention further relates to a method of securing an article of clothing by contacting a protective pad with the double sided adhesive element, and also relates to protective pads having at least one impact absorbing member and a double sided adhesive element disposed on said protective pad.

The use of the flexible adhesive members forms a bond between the pad and the jersey, minimizing or eliminating movement of the jersey, preventing the wearer from being grabbed, thrown, or pushed away.

The adhesive members have a preselected shape, conforming substantially to the critical portions of the wearer's protective pads. The members have also been strategically shaped to lay flat on a sharp radius (such as an Anti-Grab Epaulet) so the members do not bunch up, crease or fray.

In the past, it would take ten (10) minutes or more to secure a jersey to the wearer's pads using small strips of vinyl tape. Also, because it tears easily, vinyl-based tape is poorly suited for use in contact sports. Vinyl-based tape is also very difficult to remove following use, and leaves a sticky, damaging residue on the wearer's pads.

The present invention solves the long-standing problem of quickly and effectively securing a player's jersey in contact sports. Each player's jersey can be efficiently secured to their pads in about one (1) minute. For a team of fifteen players, whereas it would have taken two to three hours to secure their jerseys, the invention reduces that time to about fifteen (15) minutes total.

BRIEF DESCRIPTION OF THE DRAWINGS

The subject matter of the present invention may be further understood by reference to the following drawings.

DETAILED DESCRIPTION OF THE INVENTION

One embodiment of the invention relates to a double sided adhesive element for securing an article of clothing comprising a flexible support member having a first side coated with an adhesive and a second side coated with said adhesive. The adhesive element has a shape adapted to substantially conform to the shape of at least one portion of a protective pad. The double-sided adhesive element is suitable for use with shoulder pads, chest pads, back pads, and epaulets. The flexible support member is preferably made of cloth. The preferred adhesive is an acrylic adhesive.

Another embodiment of the invention relates to a method of securing an article of clothing comprising, (i) contacting a protective pad with a first side of a double sided adhesive element, the double sided adhesive element having a flexible support member, wherein the first side of the flexible support member is coated with an adhesive, and the second side of the flexible support member is also coated with said adhesive, wherein the adhesive element has a shape adapted to substantially conform to a protective pad, and (ii) contacting the article of clothing with the second side of said flexible support member.

The invention also relates to a protective pad comprising at least one impact absorbing member (i.e., protective pad or the like) having a first side and a second side, the first side of said impact absorbing member being substantially disposed against the wearer's body, and a double sided adhesive element disposed on said second side of said protective impact absorbing member (pad), said adhesive element comprising a flexible support member having a first side coated with an adhesive, and a second side coated with said adhesive, wherein said adhesive element has a shape adapted to substantially conform to said protective pad.

As used herein, the terms, "right side" and "left side" are used to refer to the right and left sides of the body, respectively.

Figure 1:
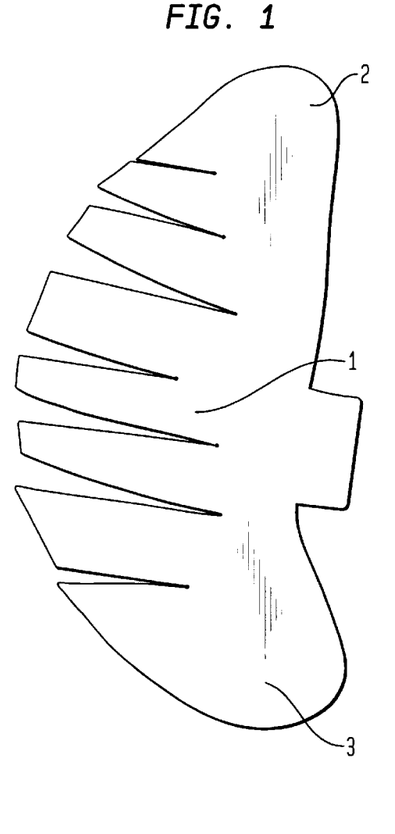
FIG. 1 depicts an adhesive member conforming substantially to the right side of an anti-grab epaulet.

FIG. 1 depicts an adhesive member 1 conforming substantially to the back portion 2 and front portion 3 of the right side of an anti-grab epaulet.

Figure 2:
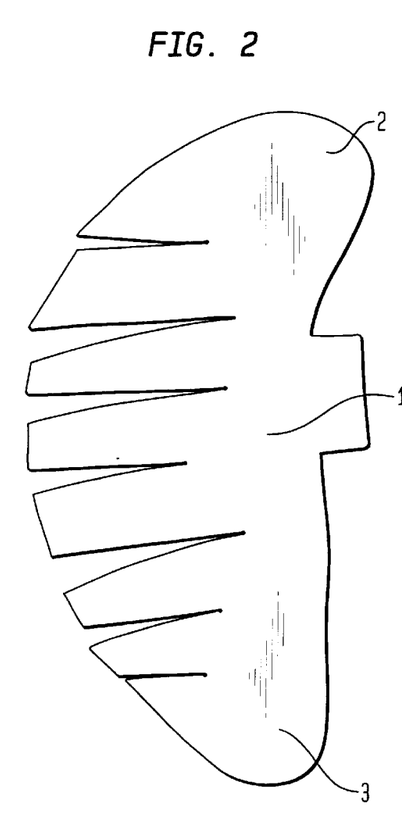
FIG. 2 depicts an adhesive member conforming substantially to the left side of an anti-grab epaulet.

FIG. 2 depicts an adhesive member 1 conforming substantially to the front portion 2 and back portion 3 of the left side of an anti-grab epaulet.

Figure 3:
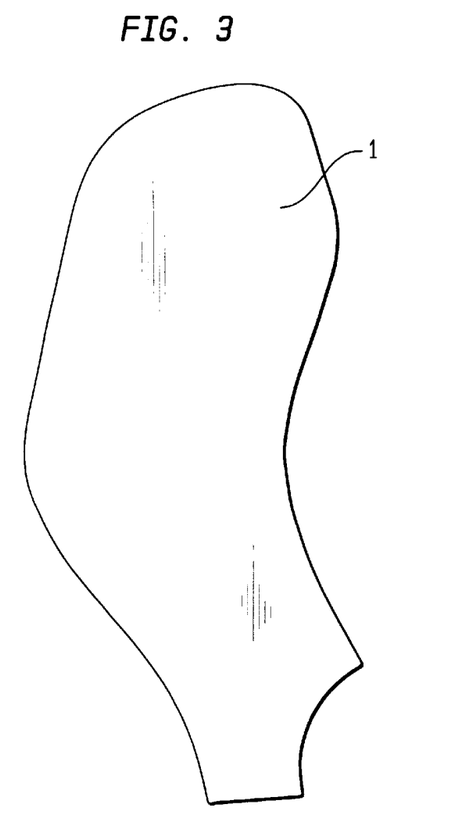
FIG. 3 depicts an adhesive member conforming substantially to the left side of the back blade.

FIG. 3 depicts an adhesive member 1 conforming substantially to the left side of the back blade pads.

Figure 4:
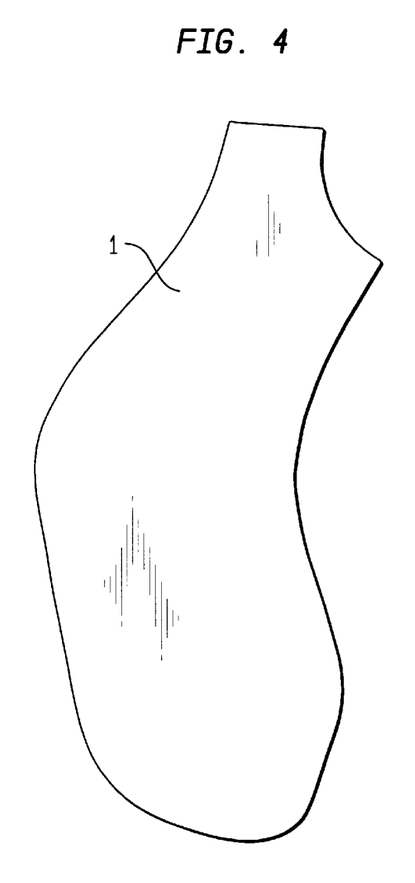
FIG. 4 depicts an adhesive member conforming substantially to the right side of the back blade.

FIG. 4 depicts an adhesive member 1 conforming substantially to the right side of the back blade pads.

Figure 5:
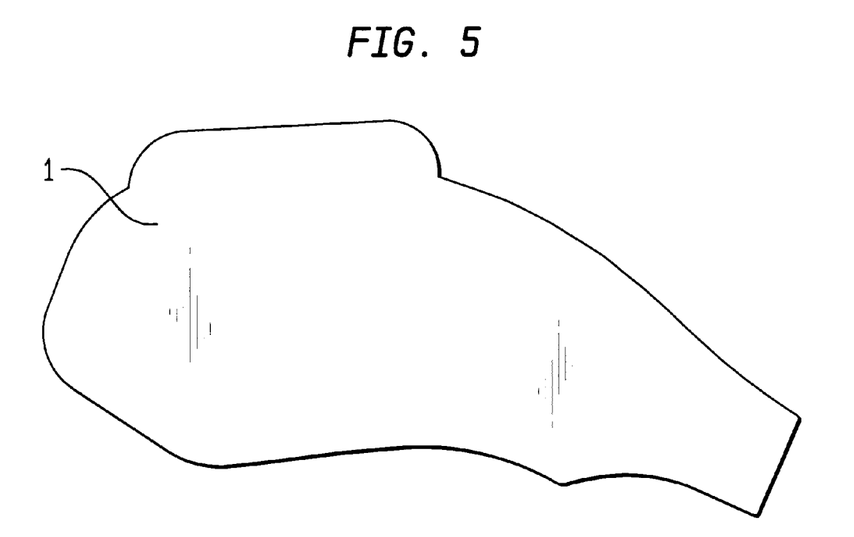
FIG. 5 depicts an adhesive member conforming substantially to the left side of the front blade.

FIG. 5 depicts an adhesive member 1 conforming substantially to the left side of the front blade pad.

Figure 6:
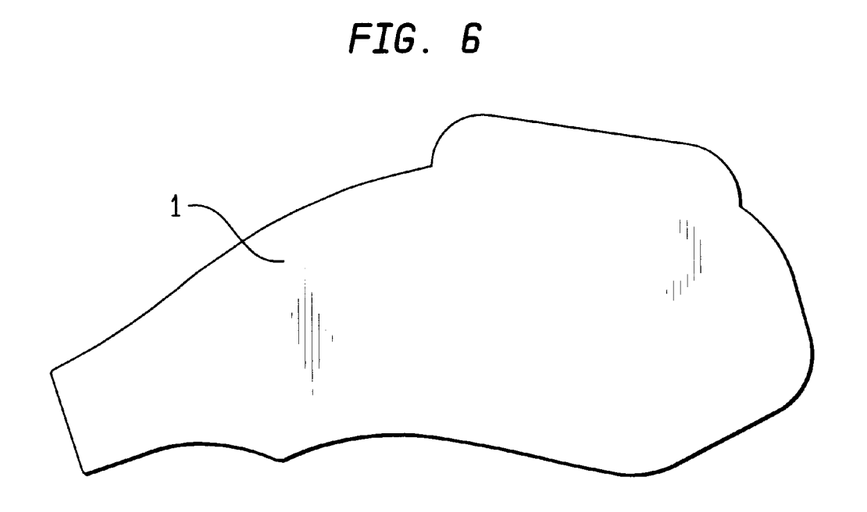
FIG. 6 depicts an adhesive member conforming substantially to the right side of the front blade.

FIG. 6 depicts an adhesive member 1 conforming substantially to the right side of the front blade pad.

Figure 7:
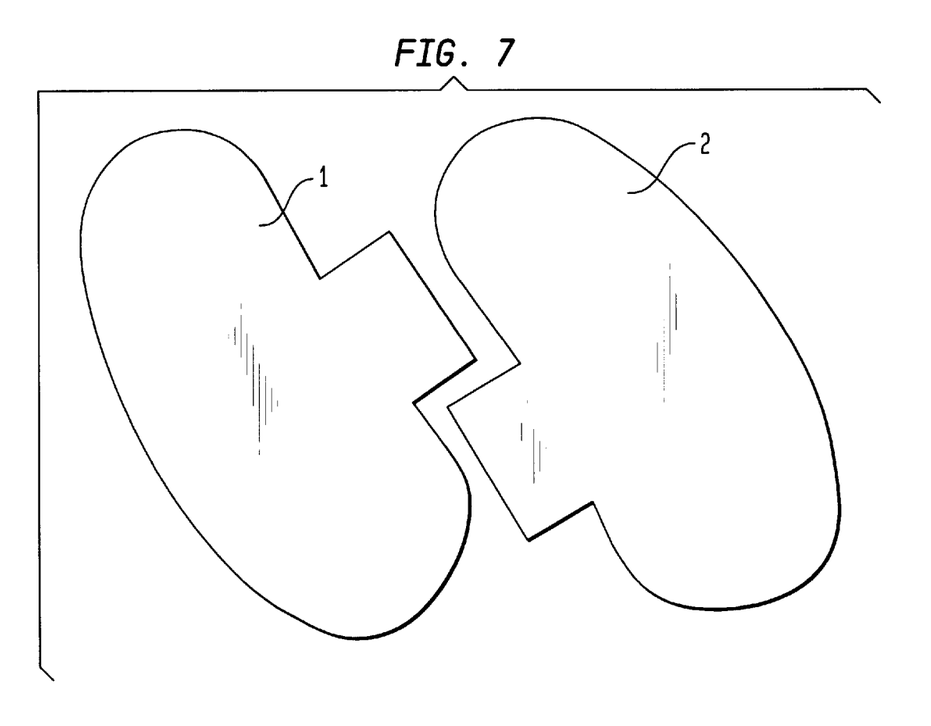
FIG. 7 depicts adhesive members conforming substantially to an epaulet, left and right sides of the body.

FIG. 7 depicts adhesive members conforming substantially to an epaulet, left side 1 and right side 2.

Figure 8:
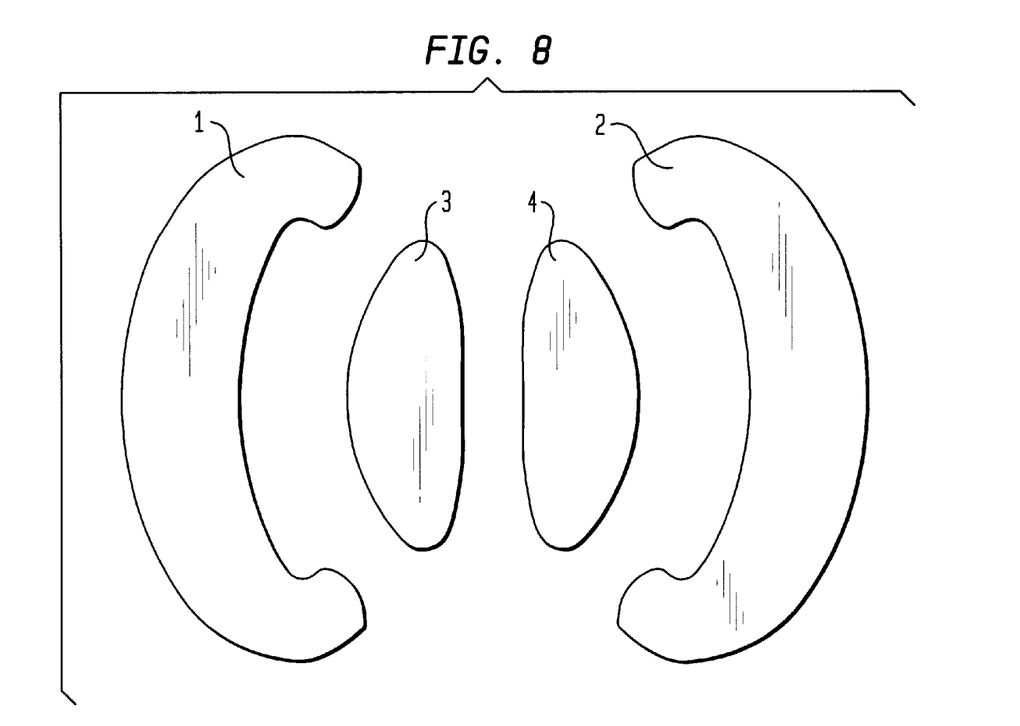
FIG. 8 depicts adhesive members conforming substantially to left and right shoulder caps, and left and right side universal fit pieces.

FIG. 8 depicts adhesive members conforming substantially to interchangeable left and right shoulder caps 1 and 2, and interchangeable left and right left side universal fit pieces 3 and 4.

Figure 9:
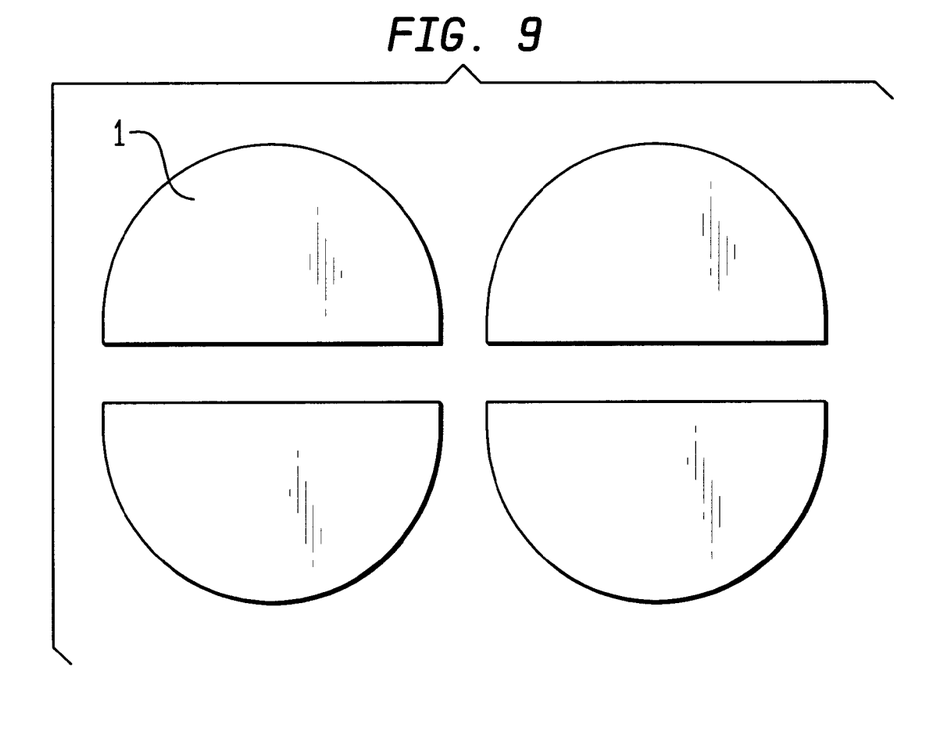
FIG. 9 depicts adhesive members conforming substantially to the deltoid pads.

FIG. 9 depicts adhesive members 1 conforming substantially to the deltoid pads.

Figure 10:
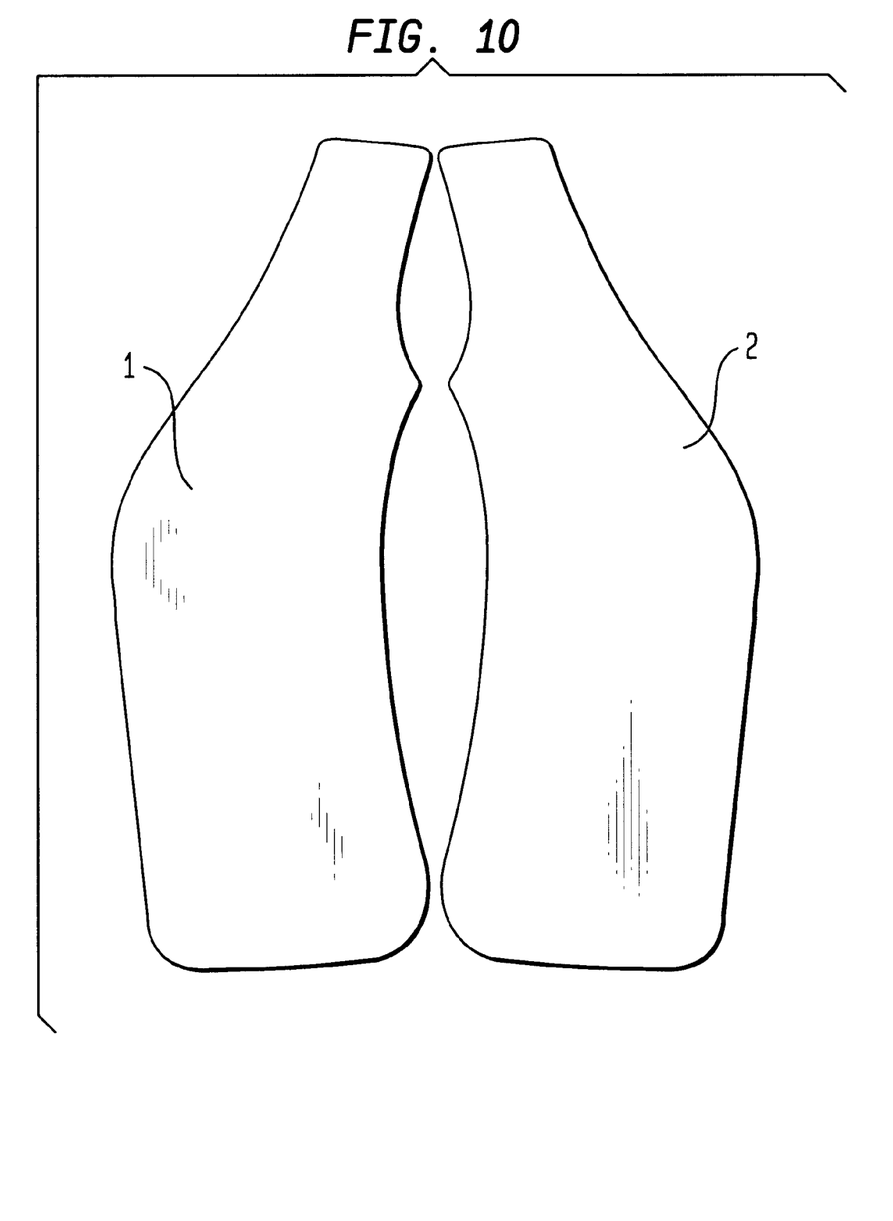
FIG. 10 depicts adhesive members conforming substantially to the front blades, right and left sides of the body.

FIG. 10 depicts adhesive members conforming substantially to the front blades, right side 1 of the body, and left side 2 of the body.

Figure 11:
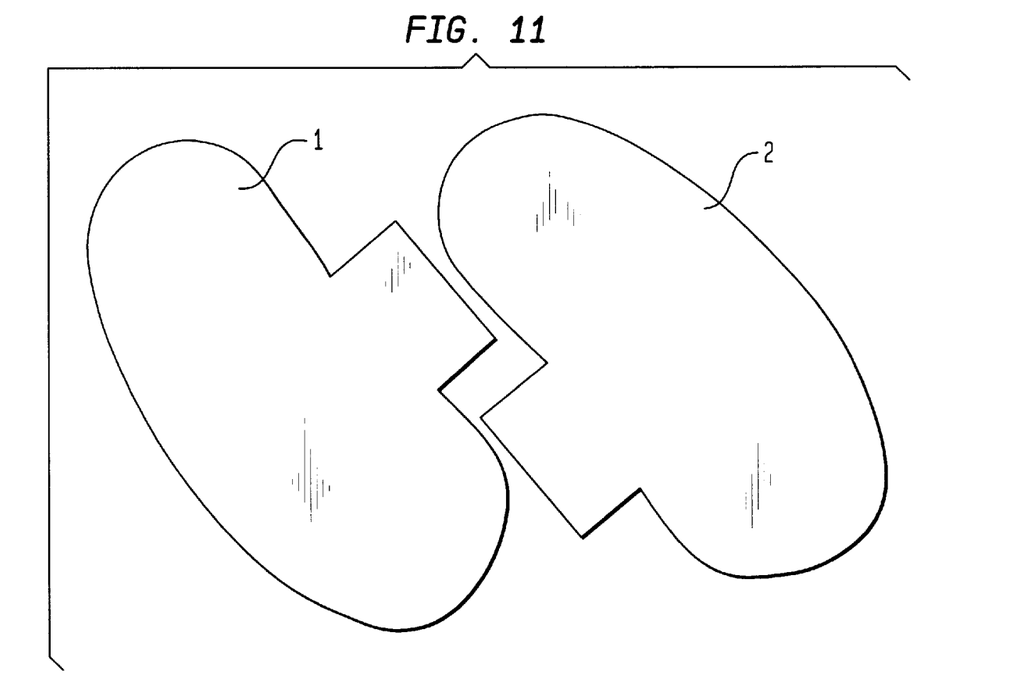
FIG. 11 depicts adhesive members conforming substantially to the epaulets, right and left sides of the body.

FIG. 11 depicts adhesive members conforming substantially to the epaulets, left side 1 of the body and right side 2 of the body.

Figure 12:
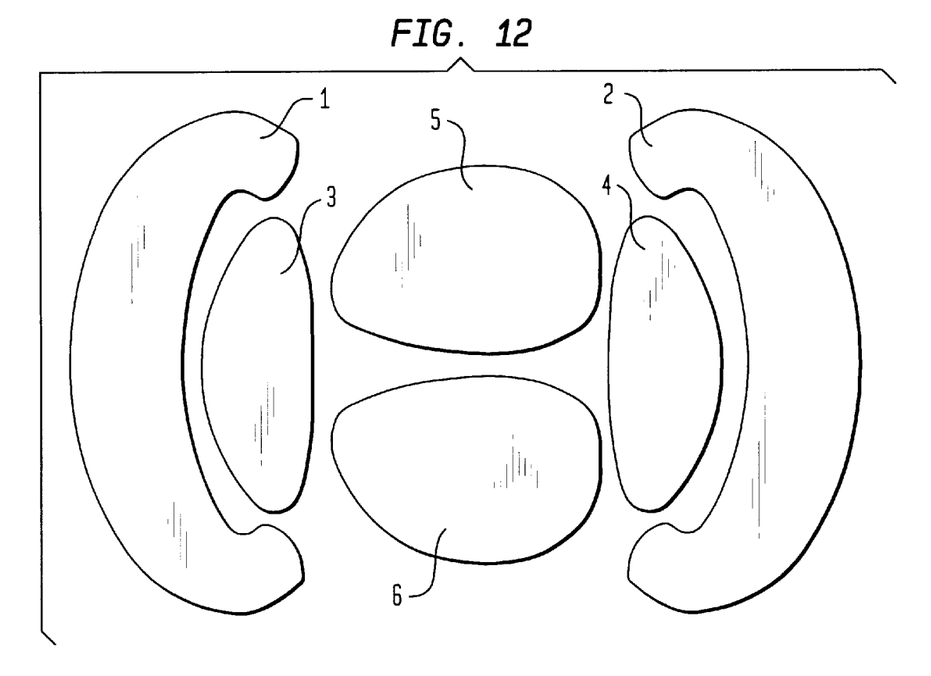
FIG. 12 depicts adhesive members conforming substantially to the shoulder caps, right and left sides, and deltoid caps, right and left side of the body.

FIG. 12 depicts adhesive members conforming substantially to the shoulder caps (left or right interchangeable) 1, 2, 3 and 4, and deltoid pads, right side 5 of the body and left side 6 of the body.

Figure 13:
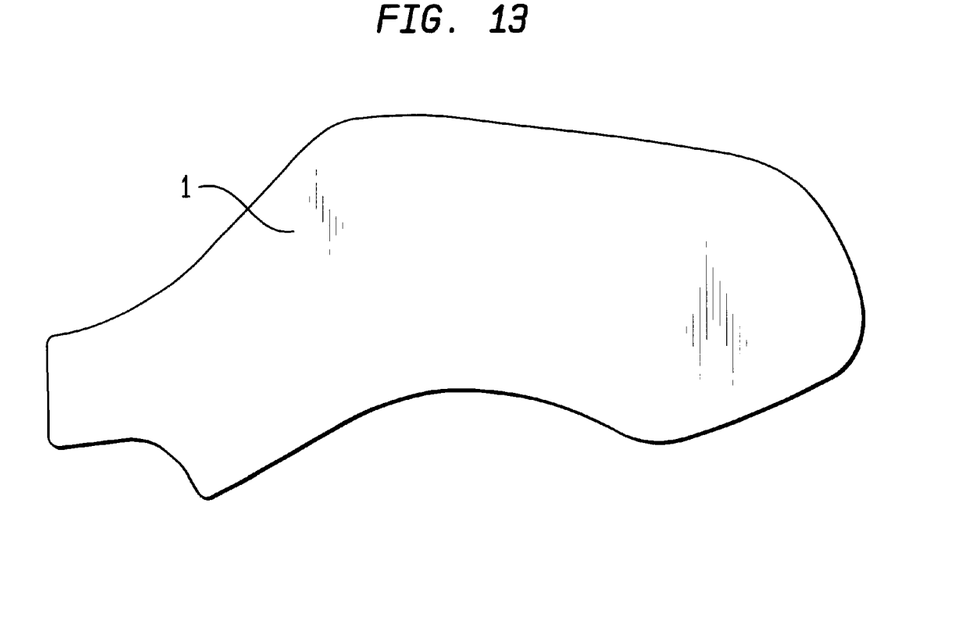
FIG. 13 depicts an adhesive member conforming substantially to the back blade, left side.

FIG. 13 depicts an adhesive member 1 conforming substantially to the back blade, left side of the body.

Figure 14:
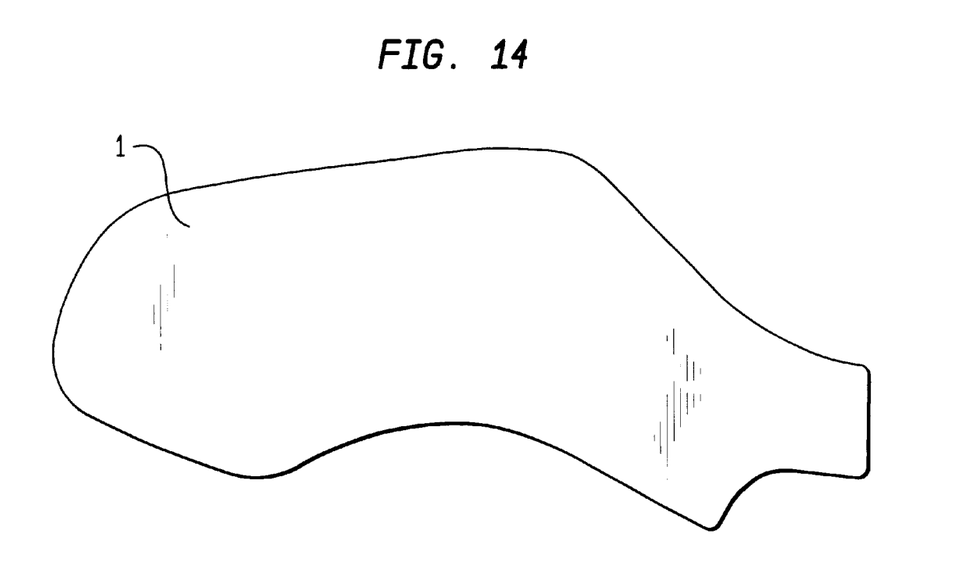
FIG. 14 depicts an adhesive member conforming substantially to the back blade, right side.

FIG. 14 depicts an adhesive member 1 conforming substantially to the back blade, right side of the body.

Figure 15:
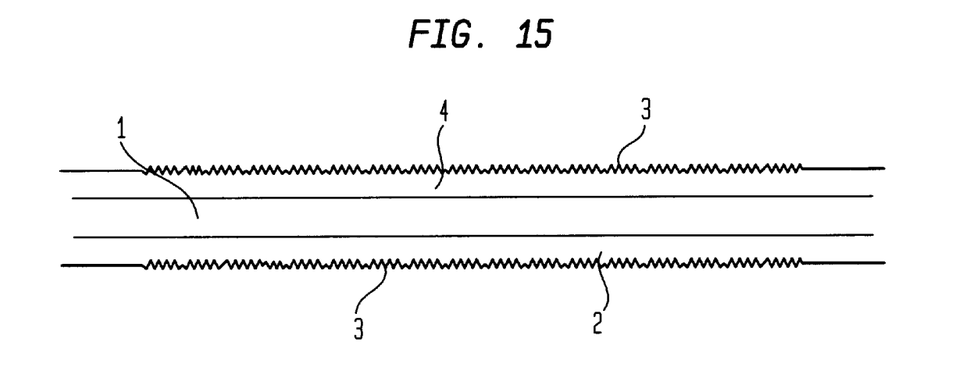
FIG. 15 depicts a cross-section of the double sided adhesive element.

Referring to FIG. 15, the flexible support member 1 has a first side 2 coated with an adhesive 3 and a second side 4 coated with the adhesive 3.

Figure 16:
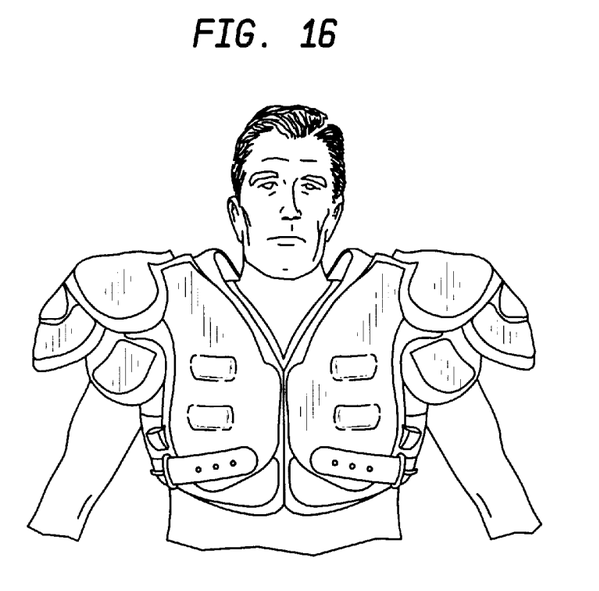
FIG. 16 is a photographic image depicting a front view of the adhesive elements in combination with a wearer's pads.

FIG. 16 is a photographic image depicting a front view of the adhesive elements in combination with a wearer's pads.

Figure 17:
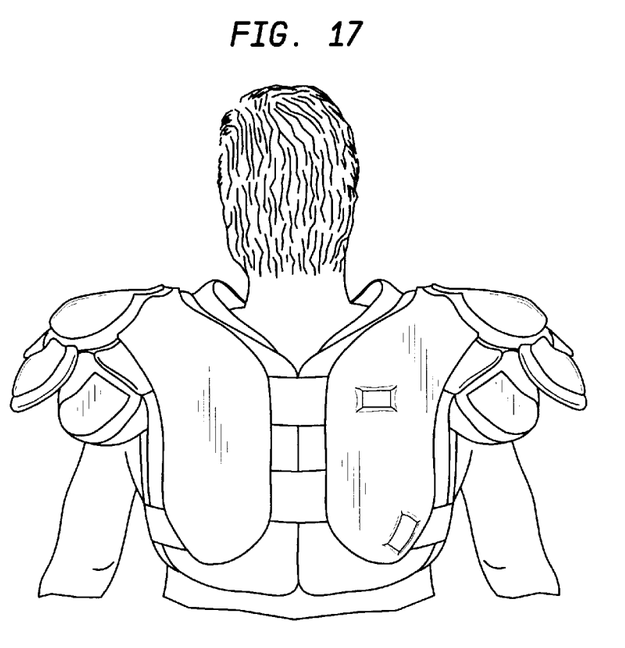
FIG. 17 is a photographic image depicting a back view of the adhesive elements in combination with a wearer's pads.

FIG. 17 is a photographic image depicting a back view of the adhesive elements in combination with a wearer's pads.

Figure 18:
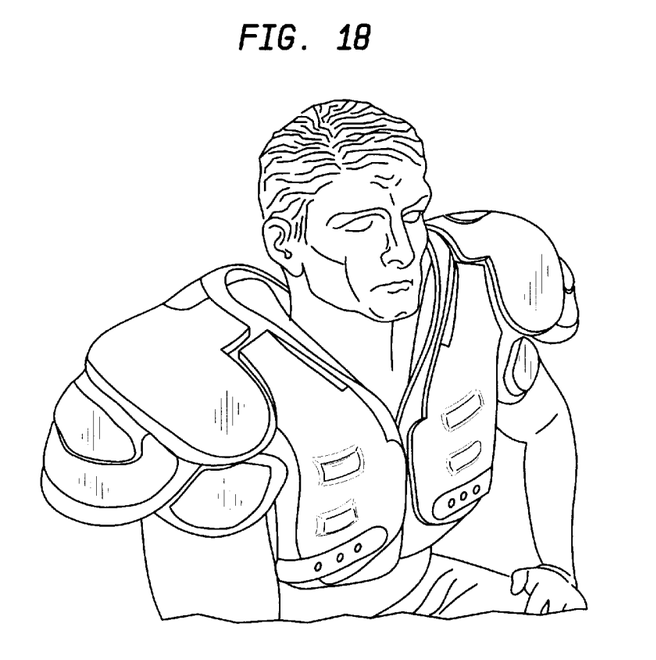
FIG. 18 is a photographic image depicting a three-quarter front view of the adhesive elements in combination with a wearer's pads.

FIG. 18 is a photographic image depicting a three-quarter front view of the adhesive elements in combination with a wearer's pads.

Figure 19:
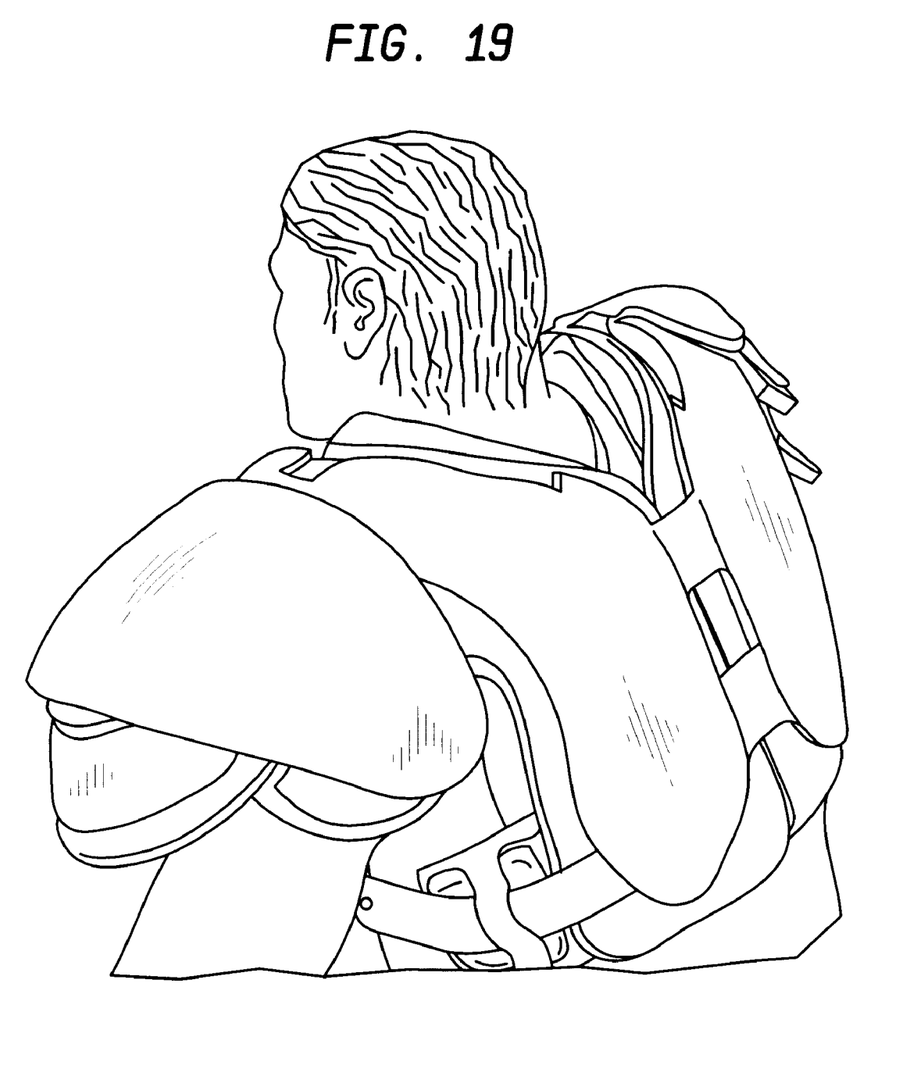
FIG. 19 is a photographic image depicting a three-quarter back view of the adhesive elements combination with a wearer's pads.

FIG. 19 is a photographic image depicting a three-quarter back view of the adhesive elements in combination with a wearer's pads.

The flexible support member is preferably made of cloth, but the support may be made of any suitable natural or synthetic material which is flexible and/or tear-resistant. In contrast to vinyl, these support members peels off easily, and in one piece. Preferred cloth members include cotton, and cotton/polyester blends. Also suitable are flexible support members made of rubber, neoprene™, rayon™, dacron™, and the like.

Although a number of adhesives are suitable for use in the invention, acrylic adhesives are preferred because they do not leave a residue on the wearer's pads when removed. A variety of other non-residue forming adhesives are also suitable for use in the present invention.

Although the invention herein has been described with respect to certain embodiments, it will be understood that these embodiments are merely illustrative of the principles and applications of the present invention. Additional modifications may be made to these embodiments without departing from the spirit of the present invention as set forth in the appended claims.

What is claimed:

1. A double sided adhesive element for securing an article of clothing comprising a flexible support member having a first side coated with an adhesive and a second side coated with said adhesive, wherein said adhesive element has a shape adapted to substantially cover and conform to a shape of a protective pad.

2. The adhesive element according to claim 1 wherein said flexible support member comprises cloth.

3. The adhesive element according to claim 1 wherein said adhesive is an acrylic adhesive.

4. The double sided adhesive element according to claim 1 wherein said protective pad is selected from the group consisting of shoulder pads, chest pads, back pads, and epaulets.

5. A method of securing an article of clothing comprising:
(a) contacting a protective pad with a first side of a double sided adhesive clement, said double sided adhesive element comprising a flexible support member, the first side of said flexible support member coated with an adhesive, a second side of said flexible support member being coated with said adhesive, wherein said adhesive element has a shape adapted to a substantially cover and conform to a protective pad; and
(b) contacting the article of clothing with the second side of said flexible support member.

6. The method according to claim 5 wherein said flexible support member comprises cloth.

7. The method according to claim 5 wherein said adhesive is an acrylic adhesive.

8. The method according to claim 5 wherein said protective pad is selected from the group consisting of shoulder pads, chest pads, back pads, and epaulets.

9. A protective pad to be worn on a wearer's body, the pad comprising:

(a) at least one impact absorbing member having a first side and a second side, the first side of said impact absorbing member being substantially disposed against the wearer's body, and
(b) a double sided adhesive element disposed on said second side of said protective pad, said adhesive element comprising a flexible support member having a first side coated with an adhesive, and a second side coated with said adhesive, wherein said adhesive element has a shape adapted to substantially cover and conform to said protective pad.

10. The protective pad according to claim 9 wherein said flexible support member comprises cloth.

11. The protective pad according to claim 9 wherein said adhesive is an acrylic adhesive.

12. The protective pad adhesive element according to claim 9 wherein said protective pad is selected from the group consisting of shoulder pads, chest pads, back pads, and epaulets.

* * * * *

UNITED STATES PATENT AND TRADEMARK OFFICE
CERTIFICATE OF CORRECTION

PATENT NO. : 6,060,408
DATED : May 9, 2000
INVENTOR(S) : Mark D. Monica

It is certified that error appears in the above-indentified patent and that said Letters Patent is hereby corrected as shown below:

Column 5, line 8, should read -- element has a shape adapted to substantially cover--

Signed and Sealed this

Thirteenth Day of March, 2001

Attest:

NICHOLAS P. GODICI

Attesting Officer

Acting Director of the United States Patent and Trademark Office